United States Patent [19]
Min

[11] Patent Number: 6,093,473
[45] Date of Patent: Jul. 25, 2000

[54] ABRASION RESISTANT LAMINATE AND METHOD FOR MAKING SAME

[75] Inventor: Ill Hong Min, Cheong Ju, Rep. of Korea

[73] Assignee: LG Technology Sales and Marketing, Inc., Tampa, Fla.

[21] Appl. No.: 09/065,252

[22] Filed: Apr. 23, 1998

[30]     Foreign Application Priority Data

Oct. 6, 1997 [KR] Rep. of Korea ................. 97-51149

[51] Int. Cl.⁷ ................. B32B 11/06; B32B 17/10
[52] U.S. Cl. ................. 428/147; 428/219; 442/287; 442/288; 442/290; 442/293; 442/295; 442/300; 442/395; 442/396; 442/398; 442/399; 442/412
[58] Field of Search ................. 442/59, 69, 85, 442/171, 287, 288, 290, 293, 295, 300, 395, 396, 398, 399, 412; 428/147, 165, 210, 211, 219

[56]         References Cited

U.S. PATENT DOCUMENTS

| | | | |
|---|---|---|---|
| Re. 32,152 | 5/1986 | Scher et al. | 428/148 |
| 3,798,111 | 3/1974 | Lane et al. | 428/219 |
| 3,936,341 | 2/1976 | Nanoux | 156/242 |
| 4,255,480 | 3/1981 | Scher et al. | 428/208 |
| 4,443,507 | 4/1984 | Yamada et al. | 428/114 |
| 4,517,235 | 5/1985 | Ungar et al. | 428/148 |
| 4,520,062 | 5/1985 | Ungar et al. | 428/148 |
| 4,713,138 | 12/1987 | Ungar et al. | 156/307.4 |
| 4,855,165 | 8/1989 | Bolgiano et al. | 427/393.5 |
| 4,963,214 | 10/1990 | Iwata et al. | 156/276 |
| 5,037,694 | 8/1991 | Ungar et al. | 428/326 |
| 5,141,799 | 8/1992 | Mehta et al. | 428/207 |
| 5,780,147 | 7/1998 | Sugahara et al. | 428/332 |

FOREIGN PATENT DOCUMENTS

| | | |
|---|---|---|
| 0 186 257 | 7/1986 | European Pat. Off. . |
| 0 477 203 | 9/1993 | European Pat. Off. . |
| 0 561 086 | 9/1993 | European Pat. Off. . |
| 0 561 086 A1 | 9/1993 | European Pat. Off. . |
| 38 39 335 | 6/1989 | Germany . |
| 196 10 079 | 9/1996 | Germany . |
| 196 10 079 A1 | 9/1996 | Germany . |
| 3-286856 | 12/1991 | Japan . |
| 4-101846 | 4/1992 | Japan . |
| 4101846 | 4/1992 | Japan . |
| 9300553 | 11/1997 | Japan . |
| 10000747 | 1/1998 | Japan . |

OTHER PUBLICATIONS

Original Pergo®. The Revolutionary Laminate Floor From Sweden. (Brochure) Perstorp Flooring, Inc., Raleigh, NC 27610. Date unknown.

New Pergo®. (Brochure). Perstorp Flooring AB, Sweden. Jan. 1997.

How To Install A Pergo® Laminate Flor Yourself. (Installation Guide) Perstorp Flooring, Inc. Horsham, PA 19044. Date unknown.

*Primary Examiner*—Elizabeth M. Cole
*Assistant Examiner*—John J. Guarriello
*Attorney, Agent, or Firm*—Jones, Day, Reavis & Pogue

[57]          ABSTRACT

Abrasion resistant laminates which are aesthetically pleasing, water-resistant/water-repellant, and flexible are formed by laminating a wear-resistant durable multi-layer top assembly to a base layer formed from an inexpensive, water resistant, polymeric substrate. The durable multi-layer wear-resistant top layer assembly comprises a wear resistant upper layer, a decorative layer, and a core layer. The polymeric base layer comprises a water resistant substrate which is positioned beneath the top layer assembly and is laminated thereto with a water resistant adhesive. This abrasion resistant laminate could be applicable in a variety of situations wherever a decorative and/or abrasion resistant product could be used and would be particularly useful in the floor covering industry.

19 Claims, 3 Drawing Sheets

ABRASION RESISTANT LAMINATE AND METHOD FOR MAKING SAME

BACKGROUND OF THE INVENTION

The present invention is directed to an abrasion resistant laminate and more particularly to an abrasion resistant laminate having a wear-resistant durable multi-layer surface assembly which is laminated to a base layer formed from an inexpensive, water resistant, polymeric substrate. This abrasion resistant laminate could be applicable in a variety of situations wherever a decorative and/or abrasion resistant product could be used and is particularly useful in the floor covering industry.

It is well known that abrasion resistance particles can be applied on or within an overlay layer or on or within a decor sheet to enhance the abrasion resistance of the laminate. Examples of the techniques for applying these particles can be found in U.S. Pat. No. 3,798,111 to Lane, U.S. Pat. No. 5,141,799 to Mehta, and U.S. Pat. No. 4,713,138 to Ungar, the disclosures of each of which pertaining to methods of incorporating abrasion resistant particles on or within an overlay or on or within a decor layer are hereby incorporated by reference.

The use of polymeric substrates, particularly polyvinyl chloride, for covering floors and countertops is also well known. Many problems have been associated with this type of covering including the durability and wear surface characteristics of these products, as well as their limited aesthetic appeal. In an effort to increase the durability of these coverings, especially in high traffic areas such as department stores, office buildings, and shopping complexes, many consumers have resorted to the use of stone materials such as granite and marble. Although quite durable, these types of materials are very expensive and cost prohibitive to the average consumer.

An example of an abrasion resistant flooring product having an abrasion resistant or wear-resistant top layer laminate is currently being produced by Perstorp Flooring AB (Sweden) under the trademark PERGO®. The PERGO® brand comprises a surface layer which provides strength and durability, a decorative layer which carries the design, and a base layer or substrate layer which provides strength, stability and heat resistance. The surface layer consists of cured melamine resin combined with cellulose paper and includes hard, abrasion resistant particles within or on the layer. The decorative layer consists of paper and melamine resin. The PERGO® product requires the surface layer and decorative layer to be laminated to a base or substrate layer which is based on a wood product. This wood-based substrate is typically particle board but could also include medium density fiberboard or hardboard. The strength and water resistance of this wood-based substrate is selected based upon the environment for which the flooring is used, e.g., standard domestic use, heavy domestic/ moderate commercial use, or standard commercial use.

The use of a wood-based substrate in the PERGO® product and other similar types of laminates has many disadvantages associated therewith, the most important of these being that additional steps must be taken to provide some waterproofness to the wood-based substrate and to ensure that the product will only be exposed to limited amounts of moisture. Care must be taken when installing this product to ensure that sufficient adhesive is used between the planks to prevent water from penetrating into the wood-based substrate. Another disadvantage of these laminates is that, because they have a wood-based substrate, they are susceptible to environmental conditions and often expand and contract. Thus, they cannot be glued directly to a surface, such as a floor, and must be installed in a "floating" configuration. The installation of a "floating" floor requires the provision of a special tongue and groove configuration along the edges of the product to minimize shifting of the planks with respect to each other during and after installation. The glue is applied along these edges to hold the flooring planks in position on the floor. Another disadvantage of wood-based substrate flooring is that their installation typically requires the placement of a film vapor barrier layer of polyethylene and a foam layer of polyethylene to provide cushioning properties and to reduce noise upon one's impact with the floor. The installation of these types of floors is very complex and often requires the services of a skilled professional, an expense that many consumers cannot afford.

The present invention eliminates all of the abovementioned disadvantages by providing an aesthetically pleasing, sound absorbing, abrasion resistant product wherein a multi-layer wear-resistant top layer assembly is laminated to a polymeric base substrate rather than a wood-based substrate. Not only is the product of the present invention water-resistant and/or water-repellent, the use of a polymeric base substrate enables the product to be glued directly to a surface, eliminating the manufacturer's cost of providing a tongue and groove configuration along the product edges. Furthermore, the product of the present invention does not require the use of additional layers such as polyethylene film vapor barrier layers and/or polyethylene foam layers positioned between the product and the surface to which it is being installed thereon in order to provide vapor resistance, sufficient give or cushioning properties thereto, and sound deadening capabilities. Thus, the product of present invention is such that it may be easily installed by the average consumer without the expense of hiring a skilled professional.

SUMMARY OF THE INVENTION

The present invention provides an abrasion resistant laminate having a wear-resistant durable multi-layer surface assembly which is laminated to a base layer formed from a polymeric substrate. The abrasion resistant laminate is aesthetically pleasing, sound absorbing, durable, wear-resistant, water-proof/water-repellant, stain resistant, less expensive to produce and easy to install. The laminate is also flexible and has reduced curl and warp. While the abrasion resistant laminate of the invention has particular utility in the manufacture of flooring, it may be useful wherever one desires a product having any or all of the abovementioned characteristics, such as for counter tops, table tops, store fixtures, wall coverings, etc.

The abrasion resistant product of the present invention comprises a durable wear-resistant top layer assembly comprising a wear resistant upper layer, a decorative layer, and a core layer. The wear resistant upper layer may be a separate overlay sheet having abrasion resistant particles on its surface or dispersed in the sheet itself. Alternatively, the wear resistant upper layer may be formed by coating the abrasive material directly on the decorative sheet or by dispersing the abrasive material into the decorative sheet. The technique of dispersing the abrasive material into the overlay or the decorative sheet occurs during the papermaking step of the overlay or decorative sheet. Known techniques may be used for applying the abrasion resistant particles.

The core layer comprises at least one, but preferably two or more layers of a material which provides reinforcement to the assembly. This core layer can include paper sheets, such as kraft paper sheets, which are typically impregnated with a resin, such as phenolic resin. The core layer can also include one or more additional layers formed from fiberglass, polypropylene, polyester, nylon, carbon fiber, or any known water resistant material. The additional layer may also be comprised of woven or nonwoven sheets and these sheets may or may not be impregnated with a resin, such as phenol. Also, the core layer may be composed solely of one or more of these water resistant sheets, thus eliminating the use of kraft paper sheets. The use of the aforementioned additional layer reduces the expansion and contraction differential of the laminate, thereby providing dimensional stability and flexibility, as well as providing improved impact and anti-puncture characteristics.

Previously known laminates typically require impregnation of the decor sheet with a resin, usually melamine resin in the amount of approximately 35–40 weight percent of the sheet. This amount of impregnating resin in the invention is approximately in the range of 0–40 weight percent of the sheet, preferably 0–30 weight percent of the sheet. The use of a reduced amount or no resin in the decor sheet produces a more stabilized laminate portion having reduced curl, reduced shrinkage, greater flexibility, greater strength, less brittleness and, therefore, less cracking.

A polymeric substrate is provided for forming a base layer for the abrasion resistant laminate. This polymeric base layer is adhered to the bottom surface (or core layer bottom side) of the top layer assembly with a water resistant adhesive.

A thin balance layer is typically laminated onto the bottom surface of the polymeric substrate to provide balance, reduce curling and/or warping of the product, to help the product to conform to the floor surface, and to improve its sound deadening characteristics.

The wear-resistant top layer assembly may be applied to the polymeric substrate by two different techniques. The first of these techniques is to form a high pressure laminate by stacking the layers of the wear-resistant top layer assembly and subjecting this assembly to heat and high pressure to cure and laminate the layers to one another. This high pressure laminate is subsequently adhered to the polymeric substrate base layer with the water resistant adhesive.

An alternative technique for forming this product is to use a low pressure method. The low pressure method can be accomplished according to two techniques. The first of these techniques requires stacking all of the layers, those forming the wear-resistant top layer assembly, the water-resistant adhesive, and the polymeric substrate base layer, and subjecting the stack to heat and low pressure to cure the layers and to laminate the layers together in a single step. The second technique requires initially laminating the layers of the wear-resistant top layer assembly under heat and low pressure and subsequently adhering this laminate to the polymeric substrate base layer with the water resistant adhesive.

The final product of the present invention has a hard wear, scratch and stain resistant surface on a flexible supporting back, with a thin soft balance sheet. These panels are flexible enough to conform to minor irregularities on the surface to which they are adhered, less expensive to produce, provide a soft cushion and sound absorbing capabilities, and are easy to install.

Further features and advantages will become apparent from the following detailed description taken in conjunction with the accompanying drawings.

DETAILED DESCRIPTION OF THE INVENTION

Figure 1A:
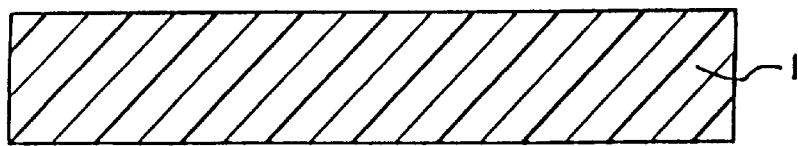
FIGS. 1A–1C show cross-sectional views of various commercially available decorative products.
Figure 1B:
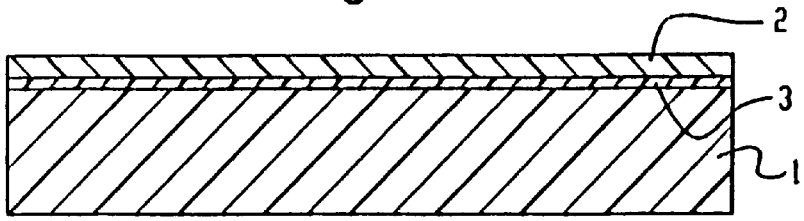
Figure 1C:

FIGS. 1A–1C are cross-sectional views of various decorative products currently available to consumers as discussed above in the background of the invention. FIG. 1A comprises a polyvinyl chloride sheet 1. This sheet has limited aesthetical appeal and very little wear-resistance to scratching, scuffing, and/or tearing. FIG. 1B comprises a laminate of a clear polyvinyl chloride top sheet 2, a polyvinyl chloride decorative sheet 3, and a polyvinyl chloride base sheet 1. While the FIG. 1B product provides a greater range of aesthetical options, the clear polyvinyl chloride top sheet 2 provides very little, if any, protection for this decorative sheet and often becomes scratched, scuffed, and/or stained. FIG. 1C shows a marble chip layer 4. While this product has excellent durability, it is very expensive and cost prohibitive to the average consumer.

Figure 2:
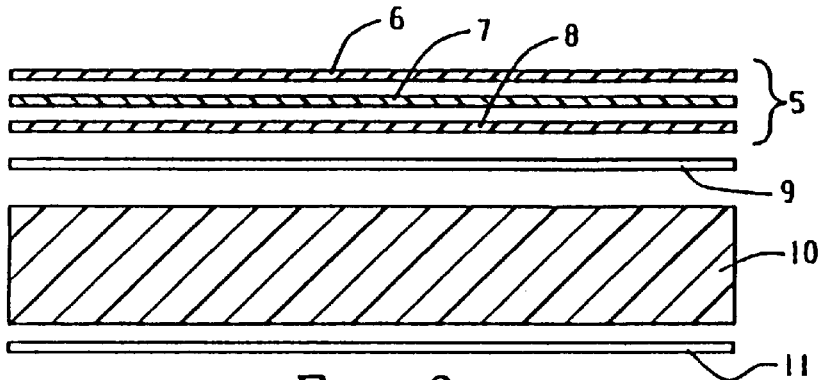
FIG. 2 shows a cross-sectional view of the abrasion resistant laminate of the present invention in expanded form.

FIG. 2 is a cross-sectional view of the abrasion resistant laminate of the present invention in expanded form. The laminate comprises a durable wear-resistant top layer assembly 5, an adhesive layer 9, and a base layer 10. The wear-resistant top layer assembly 5 comprises a wear resistant upper layer or overlay layer 6, a decorative layer 7, and a core layer 8. The base layer 10 is adhered to the wear-resistant top layer assembly via the adhesive layer 9. This base layer 10 comprises a polymeric substrate such as polyvinyl chloride. A balance layer 11 may be adhered to the bottom surface of the polymeric substrate to reduce or control curling of the laminate and to provide additional cushioning thereto.

Figure 3:
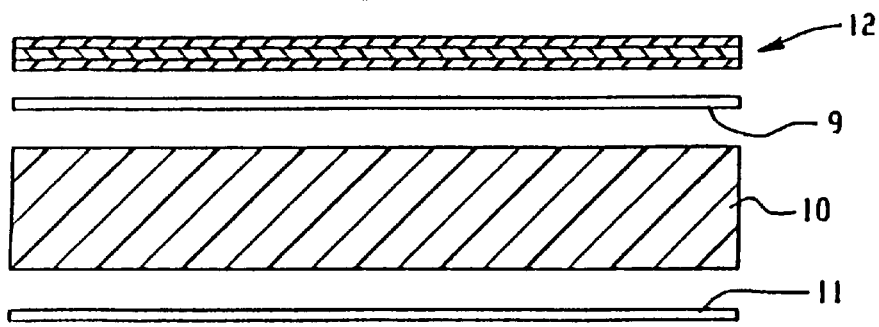
FIG. 3 shows a cross-sectional view of the abrasion resistant laminate of the present invention wherein the wear-resistant top layer has been laminated under heat and pressure to form a laminate prior to its application to the base substrate.
Figure 4A:
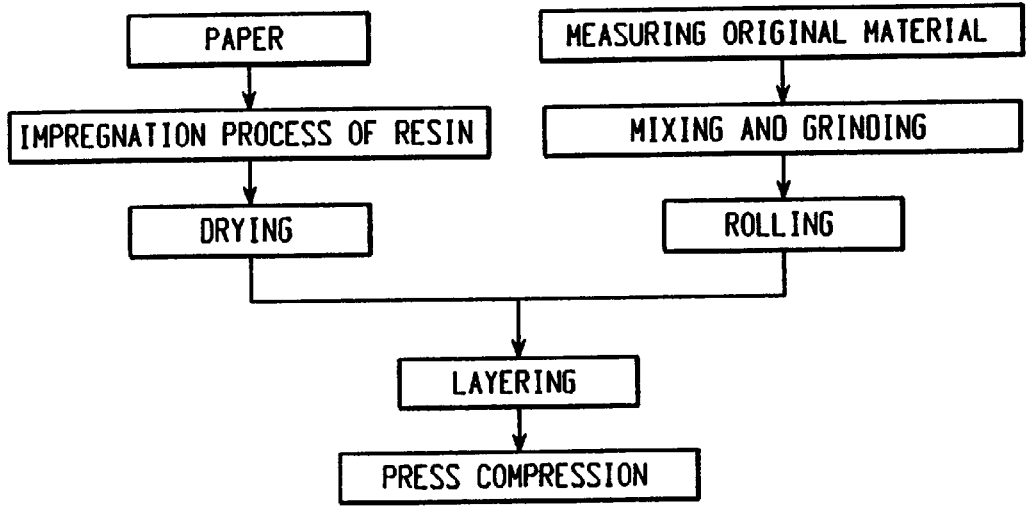
FIG. 4A shows a sequence of steps for producing the laminate of the present invention according to a first embodiment wherein the laminate is formed by a single pressing step.
Figure 4B:
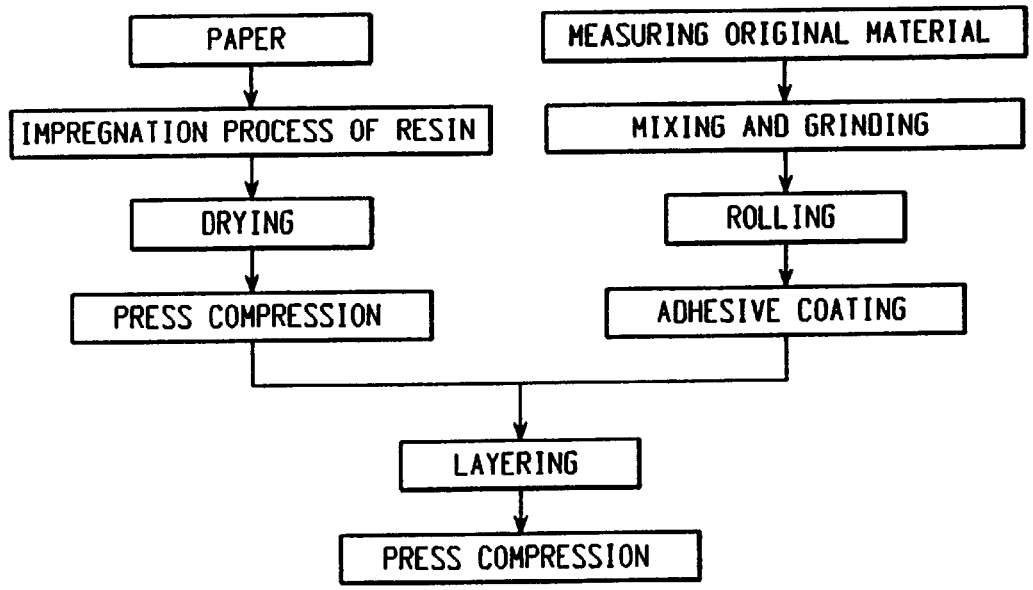
FIG. 4B shows a sequence of steps for producing the laminate of the present invention according to a second embodiment wherein the layers of the durable wear-resistant top layer assembly are laminated in a first step and this laminate is subsequently adhered to the base substrate in a second step.

FIGS. 3 and 4B show an embodiment wherein the wear-resistant top layer has been laminated under heat and pressure to form a laminate 12 prior to its application to the base substrate. This laminate 12 includes the same layers as the wear-resistant top layer 5 as discussed with respect to FIG. 2, specifically the wear resistant upper layer 6, decorative layer 7, and core layer 8. This laminate is subsequently laminated to the base layer 10.

This laminate 12 can be made according to a high pressure or a low pressure method as described in detail below. A balance layer 11 may also be adhered to the bottom surface of the polymeric substrate to reduce or control curling of the laminate and to provide additional cushioning thereto.

The wear-resistant top layer assembly may be applied to the polymeric substrate by two different techniques. The first of these techniques is to form a high pressure laminate by stacking the layers of the wear-resistant top layer assembly and subjecting this assembly to heat at a high pressure to cure and laminate the layers to one another. A high pressure laminate typically is a laminate which is made at a pressure which is greater than 750 psi and at a temperature which is approximately greater than 250° F. This high pressure laminate is subsequently adhered to the polymeric substrate base layer with the water resistant adhesive. The steps for this technique are exemplified in FIG. 4B.

An alternative technique for forming the product of the present invention is to use a low pressure method. The low pressure method can be accomplished according to two techniques. The first of these techniques requires stacking all of the layers, those forming the wear-resistant top layer assembly, the water-resistant adhesive layer, and the polymeric substrate base layer, and subjecting the stack to heat and low pressure to cure the layers and to laminate the layers together in a single step. The steps for this technique are exemplified in FIG. 4A.

The second technique for performing the low pressure method requires initially laminating the layers of the wear-resistant top layer assembly under heat at a low pressure and subsequently adhering this laminate to the polymeric substrate base layer with the water resistant adhesive. The steps for this technique are exemplified in FIG. 4B. A low pressure laminate can be formed batchwise in a static press or continuously in a double-belted press. A low pressure laminate is typically a laminate which is formed by applying heat at approximately 325–375° F. at 300 psi.

Figure 5:
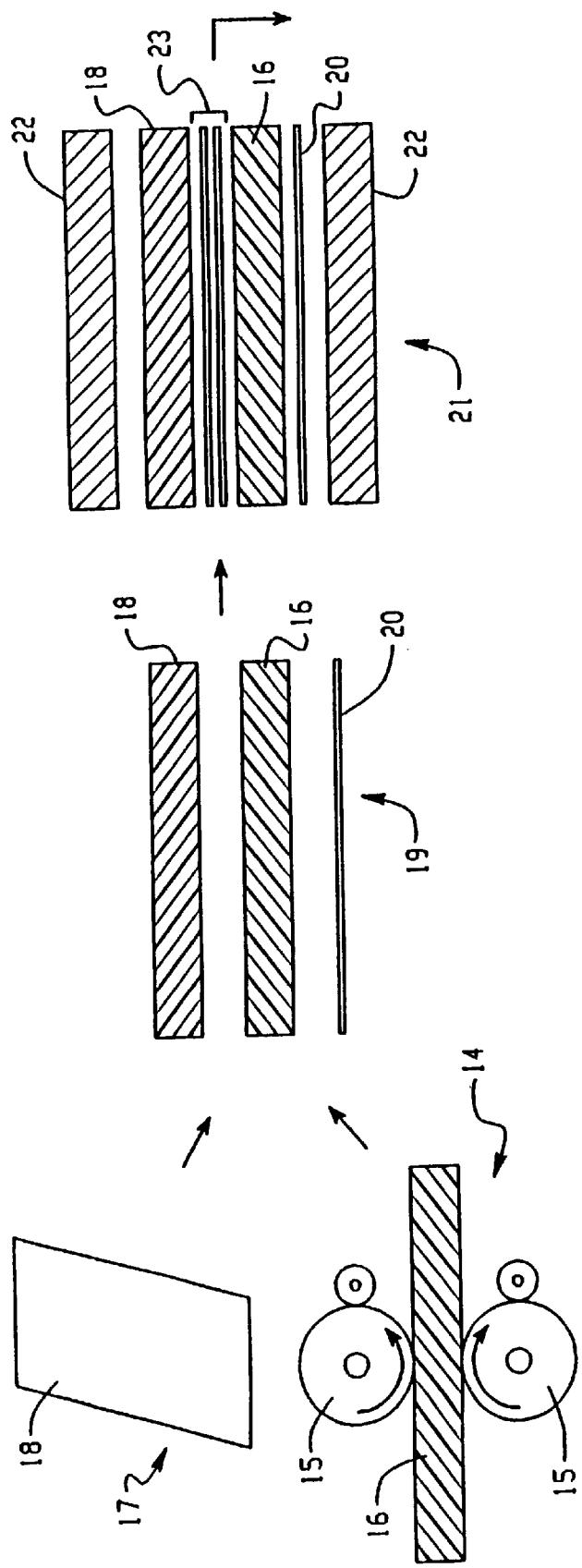
FIG. 5 shows an exemplary process for forming the laminate of the present invention corresponding with the embodiment depicted in FIG. 4B.
Figure 5:
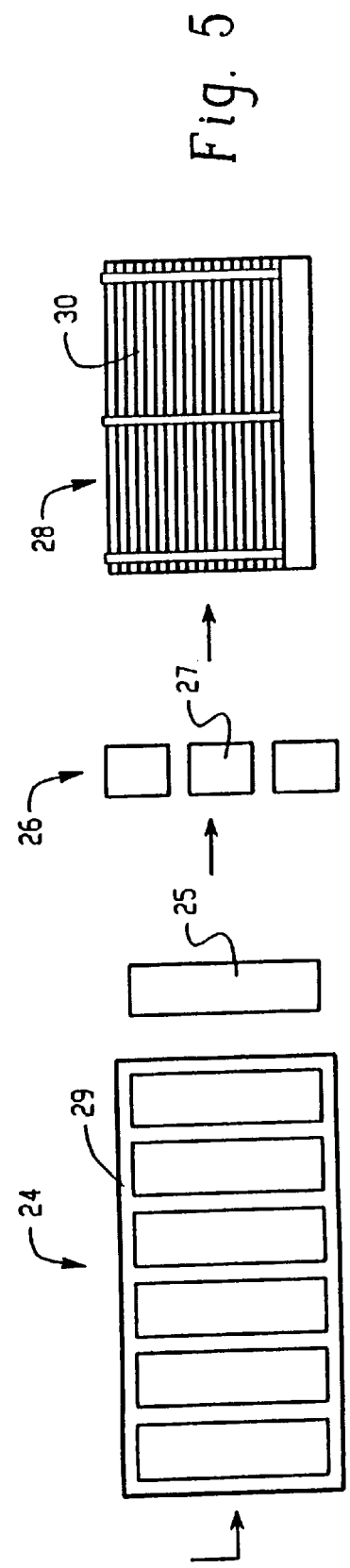

FIG. 5 shows an exemplary method for forming the laminate of the invention which corresponds with the FIG. 4B embodiment wherein the layers of the wear-resistant top layer assembly are initially laminated under conditions to form a high pressure or a low pressure laminate 18 and this high or low pressure laminate is subsequently laminated to the polymeric base layer 16. Element 14 shows the continuous application of glue to the polymeric base layer 16 by feeding the polymeric base layer 16 into the nip of a pair of glue rollers 15. Element 17 shows providing the high pressure or low pressure laminate 18 and element 19 shows stacking this laminate with the adhesive coated polymeric base layer 16 along with core layers 23 therebetween and a balance layer 20 positioned beneath the base layer 16. This stack is then placed in a platen press 21 and heat and pressure is applied via platens 22. Element 24 shows feeding the laminated product 29 to a router to form strips 25. These strips are then cut into tiles 27 at element 26. The product is then sent to a packaging and shipping location as shown by element 28 and packaged 30.

The wear-resistant or overlay layer 6 may have abrasion resistant particles coated onto its surface or dispersed therein. Also, note that although FIG. 2 shows the wear resistant upper layer as being a separate overlay sheet, the wear resistant upper layer may be formed by coating the abrasive material directly onto the decorative sheet 7 or by dispersing the abrasive material into the decorative sheet 7. The technique of dispersing the abrasive material into the overlay or the decorative sheet occurs during the papermaking step of the overlay or decorative sheet. Examples of techniques for applying the abrasion resistant particles on or within the overlay and/or decorative sheet are disclosed in the aforementioned Lane, Mehta, and Ungar patents and are discussed in detail below.

U.S. Pat. No. 3,798,111 to Lane teaches incorporating small mineral particles within and/or near the upper layer of a base paper during its manufacture. Thus, the abrasion-resistant particles are incorporated after the base layer is still in its wet state supported on the forming wire. After its manufacture, this paper may be printed, impregnated and then used in a laminating operation as the print sheet without the necessity of using an overlay.

U.S. Pat. No. 5,141,799 to Mehta shows abrasion resistant overlays and decorative sheets wherein either the overlay or the decorative sheet may contain the abrasion resistant particles. Mehta shows forming an abrasion resistant overlay by three separate techniques. The first technique requires mixing an abrasion resistant agglomerate with a paper furnish. The second technique requires uniformly adding amorphous silica in the form of an aqueous slurry to the surface of a wet web of paper through a secondary headbox of a papermaking machine. The third process requires preparing a beaten cellulose pulp by conventional means and subsequently transferring the prepared pulp to a papermaking machine where the pulp is converted in a conventional manner to paper sheet form. While in the form of a wet web of paper, the required amount of abrasion resistant agglomerate is applied to the surface of this wet web from a secondary headbox of a papermaking machine in the form of an aqueous slurry. The resulting wet sheet containing the abrasion resistant particles is subjected to wet pressing whereby the bonding of the abrasion resistant particles to and in the sheet is facilitated.

Mehta additionally shows that the decorative layer itself can include the abrasion resistant particles, thus eliminating the need for a separate overlay. The particles are applied to the decorative layer by providing a base layer for the printed decor layer. This base layer is formed on the wire of a conventional paper machine. To the formed, wet base layer, while still carried by the forming wire of the paper machine is added a top layer comprising abrasion resistant agglomerate. This top layer may also include fibers. In general, the base layer must be fairly well formed but not too free of water, prior to application of the top layer, to allow the top layer components to partially mix and combine with the base layer.

U.S. Pat. No. 4,713,138 to Ungar shows a multi-layer wear-resistant top layer laminate. This patent discloses simultaneously impregnating and coating a laminate decor sheet with a mixture of liquid impregnating resin and an abrasion-resistant composition of microcrystalline cellulose and abrasion-resistant mineral particles such as alumina. This mixture is deposited onto the top surface of the decor sheet which absorbs the liquid resin leaving on the upper surface thereof a layer of the abrasion-resistant composition plus a small amount of resin. This layer forms the abrasion resistant top layer of the laminate. After drying, the decor sheet is ready for use in the manufacture of high and low pressure decorative laminates.

The wear-resistant layer 6 may be formed by a variety of known techniques depending upon whether the final product is a solid color laminate or a printed laminate. The wear-resistant layer of a solid color laminate may be formed by three techniques. The first of these is the placement of pigmented pulp onto a forming wire of a papermaking machine to form a first layer and then the application thereto of a second layer of unpigmented pulp which includes abrasive material therein. A second technique is to use an abrasive coated overlay layer which may be placed onto a colored decor layer and is made according to known methods such as disclosed in the aforementioned Lane or Mehta patents. The third technique is to provide a melamine saturated colored paper and to place abrasive material thereon before placing the paper in an oven for curing.

If the final product is to be a printed laminate having a design thereon, then the wear-resistant layer may be formed by two known techniques. The first of these techniques requires the use of a separate overlay layer made according to known methods. The second of these techniques requires coating the abrasive material directly onto a resin impregnated printed paper prior to drying of this paper.

When using an overlay as the wear-resistant layer 6, whether producing a solid color or printed product, this overlay may comprise a transparent sheet which is produced by impregnating an alpha cellulose or paper sheet with a thermosettable resin such as melamine, polyester, or diallyl phthalate and applying abrasion resistant particles such as alumina, silica, or a mixtures thereof on or within the sheet. Any known abrasion resistant particles, preferably those having a moh hardness greater than 6, may be used. This layer protects the decorative layer 7 and provides a surface that resists pollution, scratching, and chemicals.

It will be appreciated by one skilled in the art that if the overlay layer or coated paper layer containing the abrasion resistant particles is to be pressed particle-side up, one may use a low basis weight overlay, such as alpha cellulose or the like, on top of the abrasive particle layer in order to protect the pressing plates without substantially affecting the desired abrasive resistant characteristics of the top layer.

The decorative layer 7 is a printed or colored paper which may or may not be treated with a resin. Melamine, polyester, or diallyl phthalate may also be used for this treatment. If the decorative sheet is resin impregnated, then a small amount of resin should be used. The amount of resin used can range from approximately 0–40%, preferably 0–30% based on the weight of the paper. Previous products are known that typically required about 35–40% of resin based on the weight of the paper to be used, but in the present invention, this amount is reduced or eliminated altogether, so as to prevent curling, reduce cracking, and to improve the flexibility of the product.

The core layer 8 can be formed from one or more layers of non-decorative paper which is treated with a thermosetting resin such as phenol, melamine, or a mixture thereof. This core layer provides reinforcement to the assembly. Also, the core layer prevents any surface flaws in the polymeric base substrate layer from transferring to the surface of the wear-resistant top layer at the time of compression. This core layer can include paper sheets, as mentioned above, which are commonly referred to as kraft paper sheets and are typically impregnated with a phenolic resin. The core layer can include one or more additional layers formed from fiberglass, polypropylene, polyester, nylon, carbon fiber, or any known water resistant material. This additional layer can also be woven or nonwoven sheets and these sheets may or may not be impregnated with a resin, such as phenol. Also, the core layer may be composed solely of one or more of these layers, thus eliminating the use of kraft paper sheets. The use of the aforementioned additional layer reduces the expansion and contraction differential of the laminate, thereby providing dimensional stability and flexibility, as well as providing improved impact and antipuncture characteristics. A preferred arrangement for the core layer 8 is to provide two sheets of resin impregnated paper and to sandwich one of the abovementioned additional layers between these paper layers. The additional layer may or may not be initially impregnated with resin. During pressing of the laminate, the resin in the paper sheets migrates into this additional layer. A preferred additional layer comprises a fiberglass layer having a basis weight of approximately 25–60 grams per square meter (g/m$^2$).

As stated above, previous laminates typically require impregnation of the decor sheet with a resin, usually melamine resin in the amount of approximately 35–40 weight percent of the sheet. The amount of impregnating resin used in the present invention is approximately in the range of 0–40%, preferably 0–30% based on the weight of the sheet. The use of a reduced amount or no resin in the decor sheet produces a more stabilized laminate portion having reduced curl, greater flexibility, greater strength, and less cracking.

A polymeric substrate is provided for forming a base layer for the abrasion resistant laminate. This polymeric base layer is adhered to the bottom surface (or core layer bottom side) of the top layer assembly with a water resistant adhesive. The polymeric substrate layer has a Shore A hardness of from 50–100, and preferably of about 85. This substrate may be formed from a variety of materials such as polyvinyl chloride, polyurethane, natural and synthetic rubbers, polyolefins, and polyester elastomers or any other well known material which exhibits the desired properties for the present product. The substrate is also flexible and waterproof A preferred material for forming the substrate is recycled scrap materials, such as recycled polyvinyl chloride scrap material, as the use of this recycled scrap material has economic advantages. When using a recycled scrap material for the substrate, it is preferable to laminate a balance layer onto the bottom surface of the substrate. The balance layer is described in detail below. The substrate can also include fillers, additives, and modifiers, such as carbon black, talc, clay, silicates, other minerals, and the like, known to those skilled in the art.

A thin balance layer is typically laminated onto the bottom surface of the polymeric substrate to provide balance, reduce curling and/or warping of the product, and to provide a soft cushion. This balance layer can be a paper treated with phenol resin, melamine resin, and/or acrylic resin; glass fiber treated with polyvinyl chloride resin; nonwoven fabric; a soft polyvinyl chloride layer; or a virgin polyvinyl chloride layer. The virgin polyvinyl chloride appears to be the most effective in minimizing curling when using a recycled vinyl polymeric substrate.

The effects of curling or warping of the laminate can also be reduced by reducing the amount of thermosetting resin used for impregnating the decor sheet.

The waterproof adhesive 9 which is used can be made of neoprene, nitrile, acrylic, polyester, urethane, rubber, vinyl, or any other well known polymer or combination of polymers. Any adhesive can be used as long as it is waterproof and is compatible with the layers that it comes into contact with, e.g., the base substrate layer 10 and the core layer 8. The adhesive 9 may be coated on the bottom surface of the core layer 8 or on the top surface of the base substrate layer 10. Alternatively, the adhesive 9 may be a separate adhesive film such as a polyurethane or phenolic film adhesive.

The final product of the present invention has a hard wear, scratch and stain resistant surface on a flexible supporting back with a thin soft balance sheet. This product has an abrasion resistance which is greater than the normal 400 cycles based on NEMA TABER ABRASION LD3 3.13 (1995) and can be increased by applying additional abrasion resistant material thereon. The product is flexible enough to conform to minor irregularities in the surface to which it is applied, can be easily installed, has a variety of aesthetic capabilities, is relatively inexpensive to produce, and can be used in environments where it will readily come into contact with moisture. While this abrasion resistant laminate has particular utility in the manufacture of flooring, this laminate may be useful wherever one desires a product having any or all of the abovementioned characteristics. Examples of other uses for this product could include the manufacture of counter tops, table tops, store fixtures, wall coverings, and the like.

The examples set forth below represent embodiments of the abrasion resistant laminate of the present invention and methods for making this laminate and are not intended to be limiting as varying amounts, types, and/or thicknesses of the components of the laminate and different techniques for forming this laminate may be used in the invention.

EXAMPLE 1

An abrasion resistant is made by assembling a decorative laminate with a polymeric base.

I. The decorative laminate comprises:
  A) a 30 pound/ream overlay, containing hard particles, such as alumina or silica, impregnated with conventional melamine formaldehyde resin, such as produced by the Mead Corporation of Dayton, Ohio, and B-staged in an oven to provide a resin content of 68–72%, typically 69.2%, a volatile content of 6–8%, typically 7.5%, and a flow of 8–25%, typically 18%;
  B) a 65 pound/ream wood grain printed saturated paper, impregnated and B-staged to a resin content of 0–30%, typically 20%, and having a 3–5% volatile content, typically 4.5%; and
  C) a core pack comprising two sheets of 97 pound/ream of saturated Kraft paper which is impregnated and B-staged with an aqueous phenol formaldehyde resin to provide a resin content of 27–30%, typically 29.2%, a volatile content of 6–9%, typically 7.8%, and a flow of 2–5%, typically 3.1%. Between the Kraft sheets is placed an unsaturated, nonwoven mat, such as fiberglass weighing generally between 25–60 g/m$^2$, typically 35 g/m$^2$.

These layers are laminated in a conventional multi-opening press, which typically contains 14 laminates and 8 plates, to form a High Pressure Laminate (HPL). Heat and pressure are applied at approximately 297° F. (147° C.) under a pressure of approximately 1200 psi (81 bar) for a total press cycle of one hour. The laminate is then trimmed and sanded to a desired thickness.

II. The polymeric base can be formed by the following steps:
  A) Mixing polyvinyl chloride scrap, pigment, additives, and filler in a Banbury mixer and 2 roll mill until uniform. An example of the amounts and types of these components which can be used include 100 parts of polyvinyl chloride scrap; 3 parts carbon black pigment; 2 parts chemical additives; and 10 parts of clay filler;
  B) Calendering the mixture to produce a substrate sheet which is approximately 2.4 mm thick;
  C) Providing a sheet of commercial black, soft virgin polyvinyl chloride;
  D) Hot nip rolling the virgin polyvinyl chloride sheet at a temperature which is sufficient to bond this sheet to the substrate sheet to form the base substrate having an approximate thickness of 2.5 mm; and
  E) Running the base substrate through a series of smoothing rollers to flatten it and subsequently rolling the base substrate into a roll for future use.

III. The high pressure decorative laminate is bonded to the polymeric base by the following steps:
  A) The polyvinyl chloride base and laminate are cut to the same size;
  B) A urethane adhesive is coated onto the scrap polyvinyl chloride side of the polymeric base. Alternatively, the adhesive may be applied to the core side (or sanded side) of the decorative laminate;
  C) The sanded side of the laminate is placed on the adhesive; and
  D) The assembly is then pressed in a multi-opening press at approximately 266° F. (130° C.) and at about 212 psi (14.4 bar) until the adhesive is cured.

IV. The sheets are finally cut to tile size, inspected, and packaged.

The laminates of this example have an abrasion resistance which is greater than 10,000 cycles based on NEMA TABER ABRASION LD3 3.13 (1995) This abrasion resistance can be increased by applying additional abrasion resistant overlays thereon.

EXAMPLE 2

I. The Decorative Laminate

A decorative laminate can be produced in a continuous laminate press using a conventional double belted press. The laminate comprises the same components as recited in Example 1 except for the use of a slightly higher resin content in the amount of approximately 75% in the overlay layer and approximately 37–38% in the core. The paper and the other web components remain the same as recited in Example 1. The double belted press applies pressure at approximately 700 psi (48 bar) at a temperature of about 350° F. (177° C.) to form a low pressure laminate.

Steps II, III, and IV, the base forming, bonding, and cutting/inspection steps are the same as in Example 1. This example produces a laminate which is similar to the laminate of Example 1.

EXAMPLE 3

I. Decorative Laminate

A high pressure laminate is made with the same components as recited in Example 1 except that a heavier fiberglass mat such as between 35–60g/m$^2$ and kraft paper are used to produce a final laminate having a thickness of approximately 0.7 mm. The use of thicker and/or additional layers produces a final laminate having better impact resistance which would be desirable for heavier use areas such as commercial floors.

II. Polymeric Base

A commercial 3.0 mm thermoplastic urethane base with 0.4 mm polyvinyl chloride balance sheet is bonded to the bottom of the decorative laminate.

III. Bonding

A phenolic film adhesive is used and the layers are placed in a hot press at 260° F. (130° C.) to bond the decorative laminate to the polymeric base.

IV. Cutting and inspection are the same as in Example 1.

EXAMPLE 4

I. Decorative Laminate

The continuous laminate of Example 2 is used.

II. Polymeric Base

The same polymeric base as recited in Example 3 is used.

III. Bonding

The same film adhesive and temperature is used as recited in Example 3.

IV. Cutting and inspection are the same as the preceding examples.

In all cases the properties, performance, and appearance are the same except for thickness when using thicker laminate and base.

Having described and illustrated the principles of our invention with reference to preferred embodiments, it will be recognized that the invention can be modified in arrangement and detail without departing from the spirit and scope of this invention. Accordingly, all such modifications and changes as fall within the scope of the appended claims are intended to form part of this invention.

I claim:

1. An abrasion resistant laminate comprising:
   (a) a durable wear-resistant top layer assembly comprising the following layers:
      a wear resistant upper layer;
      a decorative layer comprising a paper decor sheet; and
      a core layer comprising at least two sheets of resin impregnated kraft paper;
   (b) a polymeric substrate for forming a base layer for said abrasion resistant laminate, said base layer being positioned beneath said top layer assembly; and
   (c) a water resistant adhesive layer positioned between said top layer assembly and said base layer for adhering said assembly to said base layer to form said abrasion resistant laminate.

2. An abrasion resistant laminate as recited in claim 1 wherein said durable wear-resistant top layer assembly comprises a high pressure laminate which is formed by curing and laminating the layers of the top layer assembly under heat and high pressure prior to laminating the top layer assembly to the base layer to form said abrasion resistant laminate.

3. An abrasion resistant laminate as recited in claim 1 wherein said durable wear-resistant top layer assembly comprises a low pressure laminate which is formed by curing and laminating the layers of the top layer assembly under heat and low pressure prior to laminating the top layer assembly to the base layer to form said abrasion resistant laminate.

4. An abrasion resistant laminate as recited in claim 1 wherein said abrasion resistant laminate is a low pressure laminate which is formed by laying up the top layer assembly, the adhesive layer, and the base layer into a stack and curing and laminating the stack in a single step by the application of heat and pressure to form said abrasion resistant laminate.

5. An abrasion resistant laminate as recited in claim 1 wherein said wear resistant upper layer comprises an overlay layer comprising a sheet formed from a resin impregnated paper sheet having abrasion resistant particles coated thereon or dispersed throughout said paper sheet.

6. An abrasion resistant laminate as recited in claim 1 wherein said wear resistant upper layer comprises a coating of abrasive material applied directly to the decorative layer or dispersed throughout said decorative layer.

7. An abrasion resistant laminate as recited in claim 1 wherein said decorative layer is impregnated with a thermosetting resin in an amount equal to approximately 0–40% based upon the weight of the paper.

8. An abrasion resistant laminate as recited in claim 1 wherein said decorative layer is impregnated with a thermosetting resin in an amount equal to approximately 0–30% based upon the weight of the paper.

9. An abrasion resistant laminate as recited in claim 1 wherein said core layer comprises at least one layer of a woven or nonwoven sheet formed from a material selected from the group consisting of fiberglass, polypropylene, polyester, nylon, and carbon fiber.

10. An abrasion resistant laminate as recited in claim 9 wherein said layer of a woven or nonwoven sheet is placed between the resin impregnated sheets of the core layer.

11. An abrasion resistant laminate as recited in claim 9 wherein said core layer includes a fiberglass layer having a basis weight of 25–60 g/m$^2$.

12. An abrasion resistant laminate as recited in claim 1 wherein said polymeric substrate comprises a flexible waterproof material selected from the group consisting of polyvinyl chloride, polyurethane, polyolefins, polyesters, synthetic rubber, and natural rubber.

13. An abrasion resistant laminate as recited in claim 1 wherein said polymeric substrate comprises recycled polymeric material.

14. An abrasion resistant laminate as recited in claim 1 wherein said adhesive layer comprises an adhesive which is compatible with the core layer and the base layer.

15. An abrasion resistant laminate as recited in claim 1 wherein said adhesive layer comprises a film adhesive or a coating of adhesive.

16. An abrasion resistant laminate as recited in claim 1 wherein a balance sheet is laminated to a bottom surface of said base layer.

17. An abrasion resistant laminate as recited in claim 16 wherein said balance sheet comprises resin treated paper, polyvinyl chloride treated glass fiber, nonwoven fabric, soft polyvinyl chloride, or virgin polyvinyl chloride.

18. An abrasion resistant laminate as recited in claim 17 wherein said balance sheet comprises a virgin polyvinyl chloride sheet.

19. An abrasion resistant laminate as recited in claim 1 wherein said abrasion resistant laminate is a floor covering.

* * * * *